(12) United States Patent
Jelinek et al.

(10) Patent No.: US 7,116,316 B2
(45) Date of Patent: Oct. 3, 2006

(54) AUDIBLE AND VISUAL EFFECTS AS A RESULT OF ADAPTIVE TABLET SCANNING

(75) Inventors: Lenka M. Jelinek, Hillsboro, CA (US); Timothy L. Brooke, Portland, OR (US); Frank T. Brown, Beaverton, OR (US); Herman D. D'Hooge, Hillsboro, OR (US); Wendy A. March, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 10/094,583

(22) Filed: Mar. 7, 2002

(65) Prior Publication Data

US 2003/0169237 A1    Sep. 11, 2003

(51) Int. Cl.
*G09G 1/00*   (2006.01)
(52) U.S. Cl. ............... 345/180; 345/104; 345/156; 345/173; 345/175; 178/18.01; 178/18.03; 178/18.09
(58) Field of Classification Search ............ 178/18.01, 178/18.03, 18.05–18.09, 18.11; 345/76, 345/82, 173–175, 104, 179, 156; 434/118, 434/162–166
See application file for complete search history.

(56) References Cited

U.S. PATENT DOCUMENTS

| | | | |
|---|---|---|---|
| 4,464,118 A | 8/1984 | Scott et al. | |
| 4,633,436 A | 12/1986 | Flurry | |
| 4,690,644 A | 9/1987 | Flanders et al. | |
| 4,793,810 A | 12/1988 | Beasley, Jr. | |
| 4,804,328 A * | 2/1989 | Barrabee | 434/308 |
| 4,911,536 A * | 3/1990 | Ditzik | 349/22 |
| 5,007,085 A | 4/1991 | Greanias et al. | |
| 5,100,329 A | 3/1992 | Deesen et al. | |
| 5,416,610 A * | 5/1995 | Kikinis | 358/474 |
| 5,501,601 A * | 3/1996 | Todokoro et al. | 434/169 |
| 5,730,602 A * | 3/1998 | Gierhart et al. | 434/155 |
| 5,874,722 A | 2/1999 | Rando et al. | |
| 5,911,533 A | 6/1999 | Fassler et al. | |
| 5,999,509 A * | 12/1999 | Sugiura et al. | 369/112.17 |
| 6,088,025 A * | 7/2000 | Akamine et al. | 345/175 |
| 6,215,901 B1 | 4/2001 | Schwartz | |
| 6,373,492 B1 | 4/2002 | Kroitor | |
| 6,491,225 B1 * | 12/2002 | Dvorkis et al. | 235/472.01 |
| 6,515,654 B1 | 2/2003 | Liao | |
| 6,572,014 B1 * | 6/2003 | Lambert | 235/380 |
| 6,928,462 B1 * | 8/2005 | Jia | 709/203 |
| 2002/0160342 A1 | 10/2002 | Castro | |

* cited by examiner

*Primary Examiner*—Richard Hjerpe
*Assistant Examiner*—Leonid Shapiro
(74) *Attorney, Agent, or Firm*—Blakely, Sokoloff, Taylor & Zafman LLP

(57) ABSTRACT

One aspect of the invention involves a writing tablet comprising a housing having a writing surface and internal logic placed within the housing and situated below the writing surface. The internal logic includes imaging sensor, a light source and a controller. The imaging sensor is adapted to capture a location and orientation of each line segment forming a graphic image. The light source is adapted to produce a light beam adjusted for display on the writing surface. The controller is adapted to control performance of an event upon the light beam crossing a line segment of the graphic image.

12 Claims, 4 Drawing Sheets

AUDIBLE AND VISUAL EFFECTS AS A RESULT OF ADAPTIVE TABLET SCANNING

FIELD

The invention generally relates to the field of writing tablets. In particular, one embodiment of the invention relates to a writing tablet that performs an event upon detecting a graphic image written on the screen of the writing tablet.

GENERAL BACKGROUND

Over the past decade, both parents and institutions are relying more heavily on educational toys as supplemental learning tools. One popular education toy is a writing tablet that is communicatively coupled to a computer. Normally, a stylus or other non-ink producing writing instrument accompanies the tablet.

As one end of the stylus comes into contact with a writing surface of the tablet, its location is registered by an image sensing mechanism situated within the tablet. In response to the user gliding the stylus across the writing surface of the tablet, outlining a desired graphic image (e.g., a handwritten alphanumeric character, a doodle, an artistic rendering, etc.), the computer generates a corresponding image for display on its monitor screen.

One problem with conventional writing tablets is that they fail to provide the user any visual or audible feedback for learning enhancement.

BRIEF DESCRIPTION OF THE DRAWINGS

The features and advantages of the invention will become apparent from the following detailed description of the invention in which.

DETAILED DESCRIPTION

In general, one embodiment of the invention relates to a writing tablet that performs an event upon detecting a graphic image written on the screen of the writing tablet during an image scanning operation. For clarity, the term "writing" and related tenses used herein involve the act of handwriting and/or drawing.

Certain details are set forth below in order to provide a thorough understanding of the invention, albeit the invention may be practiced through many embodiments other that those illustrated. Well-known circuits and operations are not set forth in detail in order to avoid unnecessarily obscuring the invention.

In the following description, certain terminology is used to describe certain features of the invention. For example, a "computing device" includes logic, namely hardware, firmware, software module(s) or any combination thereof that performs a desired function. In one embodiment, the computing device is a computer such as a desktop computer, laptop computer, hand-held (e.g., personal digital assistant), mainframe, workstation, or server. Other examples of computing devices include, but are not limited or restricted to other communication equipment such as an alphanumeric pager, a printer, a facsimile machine, a set-top box or a wireless telephone for example.

A "physical-ink writing instrument" is any device that dispenses writing solution during use. Examples of writing solution includes ink, dry ink powder, chalk, crayon, lead and the like. Examples of a physical-ink writing instrument includes a marker, ink-filled pen, pencil, crayon, etc. A "virtual-ink writing instrument" is any device that, during use, does not dispense writing solution. Examples of a virtual-ink writing instrument includes a stylus.

A "software module" is a series of instructions that, when executed, performs a certain function. Examples of a software module include an operating system, an application, an applet, a program or even a routine. One or more software modules may be stored in a machine-readable medium, which includes but is not limited to an electronic circuit, a semiconductor memory device, a read only memory (ROM), a flash memory, a type of erasable programmable ROM (EPROM or EEPROM), a floppy diskette, a compact disk, an optical disk, a hard disk, or the like.

In addition, a "graphic image" includes one or more lines segments (e.g., a single point or multiple points connected together as a marking) that form (i) handwritten alphanumeric characters or symbols or (ii) images featuring one or more geometrical shaped objects or artistic renderings. The alphanumeric characters may be in any case (upper/lower) or style (cursive or printed) and in accordance with any character type (e.g., Roman, Kanji, Arabic, Chinese, etc.).

Figure 1:
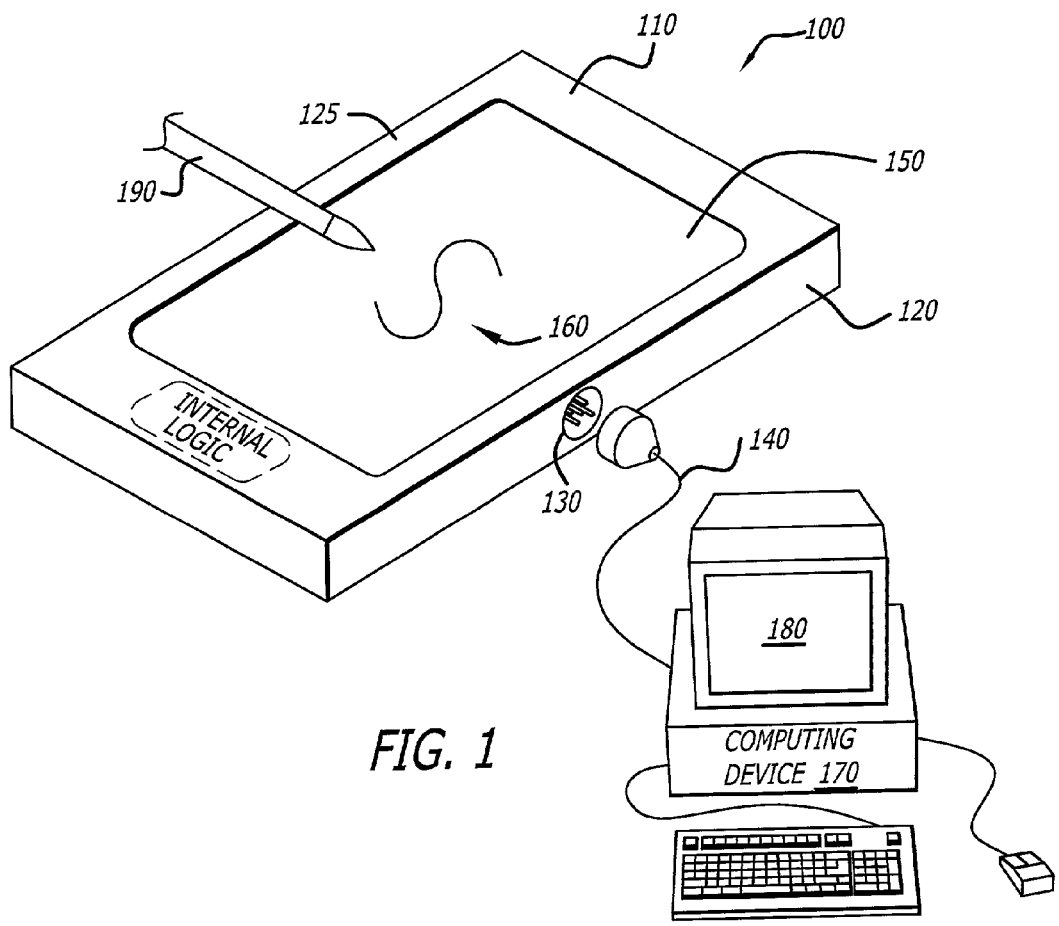
FIG. 1 is a first exemplary embodiment of a writing tablet.

Referring to FIG. 1, a first exemplary embodiment of a writing tablet 100 is shown. The tablet 100 comprises a housing 110 made of a rigid material such as hardened plastic. The housing 110 protects internal logic 200 employed within a cavity formed by the housing 110. By substantially encasing or perhaps completely encapsulating the internal logic 200, the housing 110 protects the internal logic 200 from damage and contaminants.

One surface 120 of the housing 110 is adapted with a connector port 130 to be accessible through the housing 110. The connector port 130 enables communication with a computing device 170 via a link 140. In general, the link 140 is one or more physical or virtual information-carrying mediums that establishes a communication pathway. The link 140 may be adapted as an electrical wire, electrical or optical cable, wireless signaling technology, or another means of communication.

Referring still to FIG. 1, the connector port 130 may be configured as a Universal Serial Bus (USB) port that supports "plug and play" operations. Alternatively, the connector port 130 may be a serial port or a parallel port for direct communications with the computing device 170. The connector port 130 may also be a network adapter (e.g., Ethernet adapter) that enables communication with a network. Of course, multiple connector ports may be provided to support different types of adapters.

As shown, another surface 125 of the housing 110 features a writing area 150. The writing area 150 is a region made of either a semi-opaque material having a translucent or transparent quality (e.g., plastic, glass, etc.) or a liquid crystal display (LCD) or plasma screen. The writing area 150 may be sized to accommodate an overlay of standard letter size paper (8.5"×11"), although other sized screens may be implemented as an alternative.

In one embodiment, a writing instrument 190 is used by the user to produce a graphic image 160 within the writing area 150. A representation of the graphic image 160 is transferred to the computing device 170, which is in communications with the tablet 100 and controls the display of the representation of the graphic image 160 on its monitor screen 180.

Figure 2:
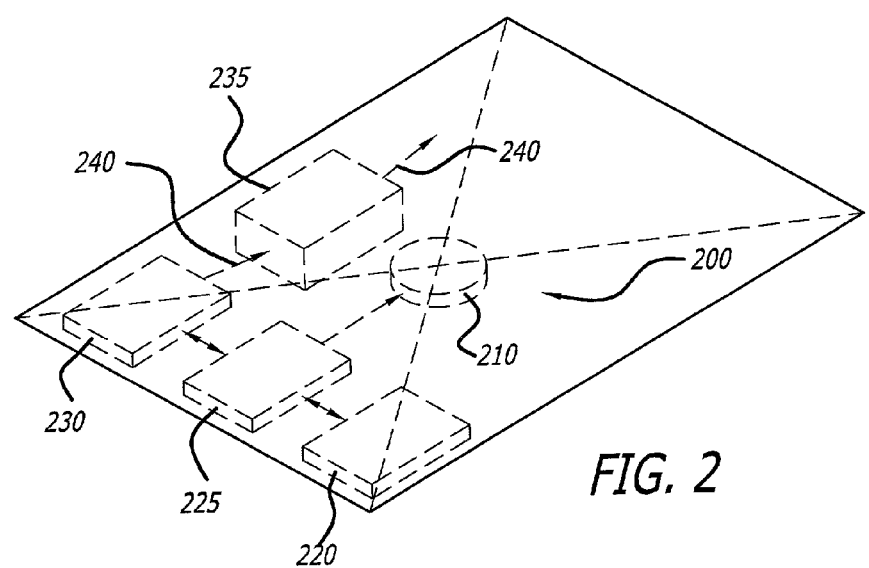
FIG. 2 is a first exemplary embodiment of internal logic situated within the writing tablet of FIG. 1.

As shown in both FIGS. 1 and 2, since the writing area 150 is semi-opaque, which means that light may pass through it, an imaging sensor 210 may be placed internally within the housing 110. As part of the internal logic 200, the imaging sensor 210 captures the graphic image 160 from below the writing area 150 of the tablet 100.

In one embodiment, the imaging sensor 210 is an optical sensor that optically captures the entire graphic image 160. A graphical location and orientation of each line segment forming the graphic image 160, perhaps in accordance with Cartesian coordinates at which a selected point on the writing surface 150 is an origin, is transferred to memory of the computing device 170. As an optional feature represented by dotted lines, the location and orientation information associated with the graphic image 160 may be temporarily stored in memory 220 before transfer to the computing device 170. Being part of the internal logic 200, the memory 220 may be volatile or nonvolatile memory.

In another embodiment, the imaging sensor 210 involves magnetic sensing, where magnetic displacement caused by the writing instrument 190 enables the imaging sensor 210 to locate and identify the writing instrument 190. As a result, specifics associated with the graphic image 160 placed on the writing area 130 may be identified as well. For example, the imaging sensor 210 may be adapted to only detect writing instruments that are in contact with the writing area 150. Also, the writing solution forming the graphic images may have magnetic characteristics that are detected when deposited on the writing area 150.

In yet another embodiment, the imaging sensor 210 may involve radio frequency (RF) or pressure sensing to determine the location of graphic images written on the writing area 150. Herein, for RF sensing, the imaging sensor 210 would receive wireless signals from one or more writing instruments in accordance with a unicast or multicast transmissions. The transmission range for the wireless signals may be adjusted so that the imaging sensor 210 can only detect the wireless signals from writing instruments that are in contact with or in close proximity to the writing area 150. Normally, this range may be varied by adjusting the level of effective isotropic radiated power (referred to as the "power level") utilized by the imaging sensor 210. However, it is contemplated that the power level may be configured to be at a constant level.

Since the imaging sensor 210 is used to capture a graphic image 160 placed on the writing area 150, the graphic image 160 may include line segments produced by physical-ink or virtual-ink writing instruments or perhaps images printed, painted or carved on any object placed on and facing the writing area 150. For example, where the imaging sensor 210 is an optical sensor, an image from a page of a children's book placed on the writing area 150 may be replicated and displayed on the monitor 180 of the computing device 170.

The internal logic 200 further includes a controller 225, light source 230, and light beam adjustment (LBA) logic 235. The controller 225 controls the light source 230, which produces a light beam 240 that is reflected and adjusted by the light beam adjustment logic 235. The controller 225 controls the operations of the light beam adjustment logic 235. Examples of the controller 225 include at least one of a general microprocessor, a digital signal processor, a microcontroller, an application specific integrated circuit (ASIC), a state machine, or other types of data processing logic.

Figure 3:
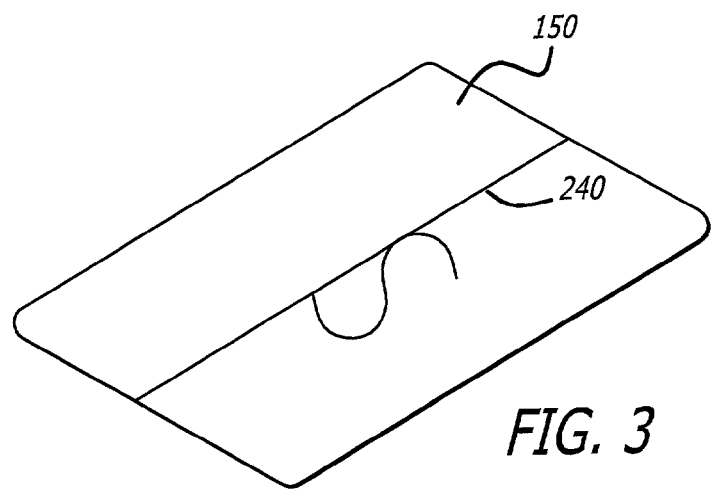
FIG. 3 is an exemplary embodiment of a scanning process conducted by the writing tablet of FIGS. 1 and 2.

As shown in FIGS. 2 and 3, the light beam 240 defines what regions of the writing area 150 that the computing device 170 is scanning to detect graphic images placed on the writing area 150. The light beam 240 illuminated on the writing area 150 may be adjusted by the light beam adjustment logic 235 so as to have an longitudinal (as shown), lateral, diagonal or circular orientation. Of course, it is contemplated that the light beam 240 may be oriented in any geometric shape. The color of the light beam 240 is a design choice.

Referring to both FIGS. 1–3, it is contemplated that prior to generation of the light beam 240, the computing device 170 is already apprised of the location of any graphic images as described above. The light beam 240 is used to identify to the user what regions of the writing area 150 are being analyzed.

According to one embodiment of the invention, as the light beam 240 encounters a line segment of a graphic image, the tablet 100 reacts by triggering an event such as an audible effect, a visual effect or a combination. In general, an "audible effect" involves the generation and play back of audio, which may be used to reinforce the user's learning of letters, numbers and common shapes. A "visual effect" is generation and display of an image or perhaps changing a color of the graphic image displayed or its background.

For instance, with respect to one embodiment, the audible effect triggered by the tablet 100 may involve the transmission of control signals to the computing device 170, which causes the computing device 170 to play back a series of musical notes upon detecting a graphic image 160. Another event may involve the computing device 170 playing back an audible rendition of a detected alphanumeric character. For example, upon scanning the writing surface and encountering the letter "S", the tablet 100 signals the computing device 170 to play a sound that verbally states the letter "S".

Of course, it is contemplated that the tablet 100 may be adapted to perform an event itself upon detecting a graphic image 160 in lieu of the computing device 170. For instance, the tablet 100 may play back musical notes over a speaker as described in FIG. 5, render an audible sound of a detected character or other audible or visual effects.

Figure 4:
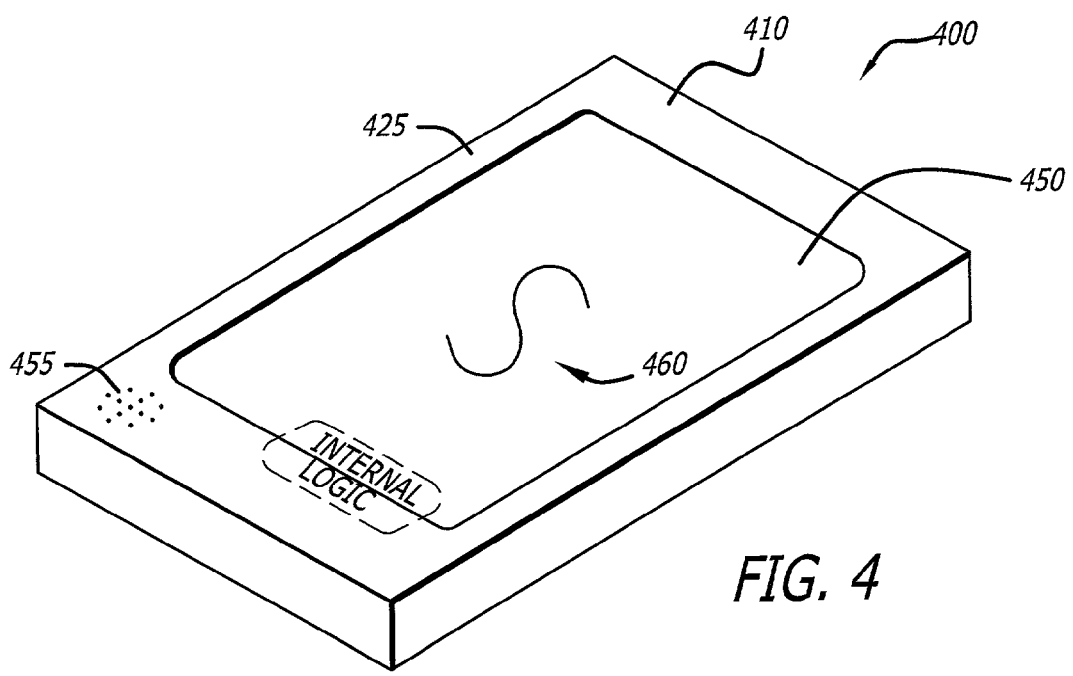
FIG. 4 is a second exemplary embodiment of a writing tablet.

Referring now to FIG. 4, a second exemplary embodiment of a writing tablet 400 is shown. The tablet 400 comprises the housing 410 that protects internal logic 500 employed within a cavity formed by the housing 410. One surface 425 of the housing 410 features a writing area 450 being a region made of either a semi-opaque material or an LCD or plasma display screen and a plurality of apertures 455 proximate to a speaker contained within the housing 410.

Similar to FIG. 1, the writing instrument (not shown) is used by the user to produce the graphic image 460 over the writing area 450. Since the writing area 450 is semi-opaque, so that light may pass through it, an imaging sensor 510 may be placed internally within the housing 410. As part of the internal logic 500 and shown in FIG. 5, the imaging sensor 510 captures the graphic image 460 from below the writing area 450 of the tablet 400.

Figure 5:
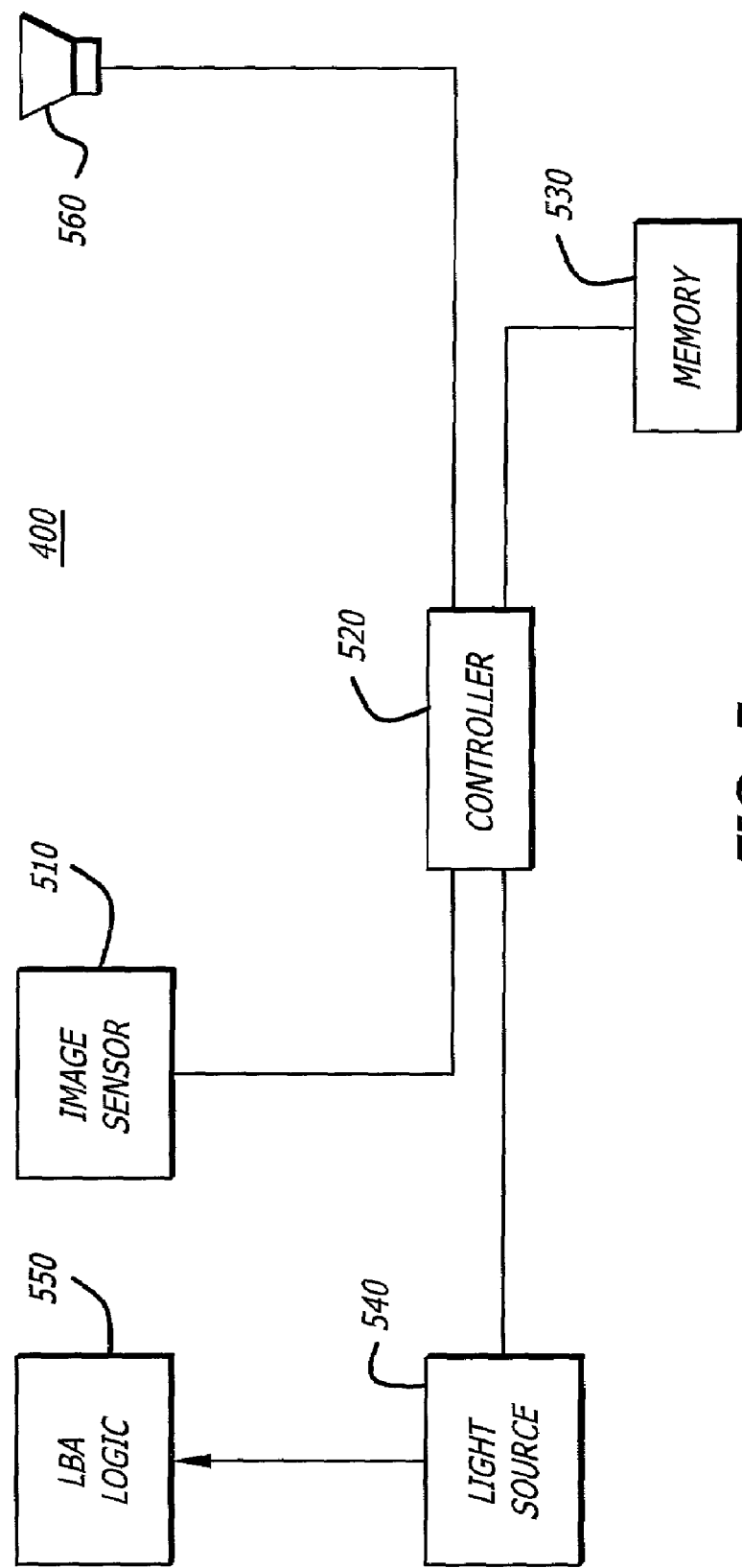
FIG. 5 is an exemplary embodiment of internal logic situated within the writing tablet of FIG. 4.

Referring now to FIG. 5, a second exemplary embodiment of the internal logic 500 situated within the writing tablet 400 of FIG. 4 is shown. Herein, the internal logic 500 includes the imaging sensor 510, a controller 520, memory 530, a light source 540, light beam adjustment (LBA) logic 550 and a speaker 560.

As shown, the imaging sensor 510 is placed internally within the housing 410 and captures the graphic image 460 from below the writing area 450 of the tablet 400. The imaging sensor 510 may operate as an optical sensor, a magnetic sensor, a RF sensor or a pressure sensor as described above.

The controller 520 controls the operation of the imaging sensor 510 and the generation of the light beam over the writing area 450 during a scanning process. The functionality of the controller 520 is programmed by software modules placed within the internal memory 530 and perhaps memory within the controller 520 itself. Examples of the controller 520 include at least one of a general microprocessor, digital signal processor, microcontroller, ASIC, state machine, and the like.

The controller 520 further controls the light beam adjustment logic 550. For example, the controller 520 may include mirrors and galvanometers to adjust mirror positioning to reflect a light beam from the light source 540 (e.g., a laser, a light emitting diode, etc.). The reflected light beam is used to indicate the region of the writing area 450 that is being scanned for graphic images. However, the controller 520 is already apprised of the location of any graphic images based on the transmission of locations of the writing instrument being used on the writing area 450. The light beam may be oriented as a longitudinal line, a lateral line, diagonal line, circular object or in accordance with any geometric shape.

Upon the light beam encountering a line segment of a graphic image, the tablet 400 reacts by triggering an event. For example, upon detecting a graphic image, the tablet 400 plays back a series of musical notes via speaker 560. Upon detecting an alphanumeric character, the tablet 400 plays back an audible rendition of the alphanumeric character over speaker 560 as well.

Figure 6:
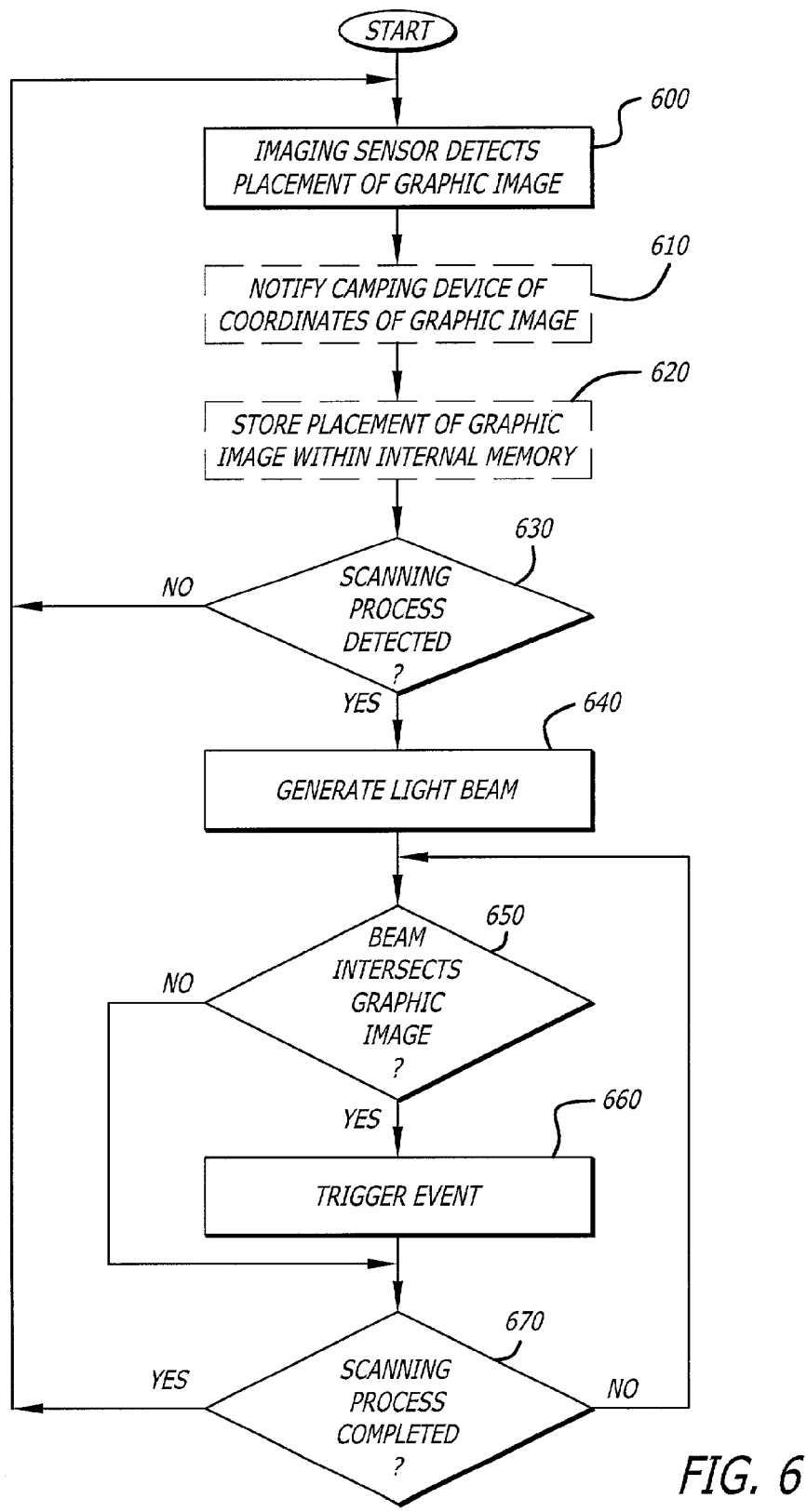
FIG. 6 is an exemplary flowchart featuring the operations of the writing tablet set forth in FIG. 1 or FIG. 4.

Referring to FIG. 6, an exemplary flowchart featuring the operations of the writing tablet set forth in FIG. 1 is shown. Herein, the imaging sensor detects placement of a graphic image on a writing surface of the tablet (block 600). In one embodiment, the tablet notifies the computing device of the specific placement (e.g., graphical coordinates) of the graphic image (block 610). In another embodiment, the information associated with the specific placement of the graphic image is stored within internal memory (block 620). This detection and notification/storage process continues until the tablet enters into a scanning process state (block 630).

During the scanning process, a light beam is generated and directed along various regions of the writing surface (block 640). The light beam may be configured in any shape or orientation. In one embodiment, once the light beam intersect a portion of the graphic image, namely graphical coordinates of a portion of the light beam and image intersect, an event is triggered (blocks 650–670). However, in another embodiment, an event may be triggered upon recognition of the image. For instance, it is contemplated that an event may be triggered only upon recognition of a particular image (e.g., alphanumeric character) so that any other image types (e.g., doodles by the user) are ignored.

In one embodiment, the triggered event is audio playback that identifies the graphic image as a particular alphanumeric character. Such identification may be accomplished when (1) the tablet is placed in a mode of operation associated with the generation of numbers or letters and (2) the tablet or computing device has already analyzed and determined the written character. One or more events may be triggered during the scanning process.

While certain exemplary embodiments have been described and shown in the accompanying drawings, it is to be understood that such embodiments are merely illustrative of and not restrictive on the broad invention, and that this invention not be limited to the specific constructions and arrangements shown and described. For example, it may be possible to implement the invention or some of its features in hardware, firmware, software or a combination thereof.

What is claimed is:

1. A writing tablet comprising:
a housing including a wilting area; and
logic contained within the housing and situated below the writing area, the logic including
an imaging sensor to detect a graphic image on the writing area,
a light source to produce on a back surface of the writing area facing an interior of the housing a light beam that is adjusted for display on the writing area,
a speaker,
an internal memory, and
a controller coupled to at least the internal memory, the light source, the imaging sensor and the speaker, the controller to control generation of an audible rendition of an alphanumeric character for output from the speaker in response to both the light beam crossing a line segment of the graphic image previously captured by the imaging sensor and the controller identifying the graphic image as the alphanumeric character.

2. The writing tablet of claim 1, wherein the light source is a light emitting diode.

3. The writing tablet of claim 1, wherein the controller is a processor.

4. The writing tablet of claim 1, wherein the internal memory includes at least one software module executable by the controller to generate signals recognized as audible sounds by the speaker.

5. The writing tablet of claim 4, wherein the internal memory includes information related to a location and orientation of the graphic image placed on the writing area.

6. The writing tablet of claim 5, wherein the information includes Cartesian coordinates at which a selected point on the writing area is an origin.

7. The writing tablet of claim 1, wherein the controller is a microcontroller.

8. A method comprising:
detecting placement of a graphic image on a writing area of a writing tablet;
generating light beam on a back surface of and visible through the writing area to represent an area of the writing tablet being analyzed and adjusted to move over the graphic image; and
triggering at least one of an audible effect and a visual effect in response to the light beam intersecting a line segment of the graphic image previously drawn on and currently displayed within the writing area and recognition that the graphic image as a particular alphanumeric character, the audible effect being an audible rendition of the alphanumeric character.

9. The method of claim 8, wherein the triggering of the at least one audible effect and visual effect includes play back of the audible rendition of the alphanumeric character by the writing tablet.

10. The method of claim 8, wherein the triggering of the at least one audible effect and visual effect includes transmitting a signal to a computing device to control the computing device to playback the audible rendition of the alphanumeric character.

11. The method of claim 8, wherein detecting placement of the graphic image includes activating an imaging sensor to detect a graphical location at which a writing instrument comes in contact with writing area and storing the location within internal memory of the writing tablet.

12. The method of claim 8, wherein detecting placement of the graphic image includes activating an imaging sensor to detect a graphical location at which a writing instrument comes in contact with the writing area and transferring information representative of the graphical location to memory within a computing device coupled to the writing tablet.

* * * * *

UNITED STATES PATENT AND TRADEMARK OFFICE
CERTIFICATE OF CORRECTION

PATENT NO. : 7,116,316 B2 Page 1 of 1
APPLICATION NO. : 10/094583
DATED : October 3, 2006
INVENTOR(S) : Jelinek et al.

It is certified that error appears in the above-identified patent and that said Letters Patent is hereby corrected as shown below:

In column 3, at line 25, after "or" delete "nonvolatile" insert --non-volatile--.

In column 6, at line 7, after second occurrence "a" delete "wilting" insert --writing--.

In column 6, at line 63, after "to" delete "playback" insert --play back--.

Signed and Sealed this

Tenth Day of April, 2007

JON W. DUDAS
*Director of the United States Patent and Trademark Office*